United States Patent
Niemeyer

(10) Patent No.: US 7,251,374 B2
(45) Date of Patent: Jul. 31, 2007

(54) SYSTEM AND METHOD FOR HIERARCHICAL ANALYSIS OF CONTRAST ENHANCED MEDICAL IMAGING INFORMATION

(75) Inventor: Tanya L. Niemeyer, Seattle, WA (US)

(73) Assignee: Confirma, Inc., Kirkland, WA (US)

( * ) Notice: Subject to any disclaimer, the term of this patent is extended or adjusted under 35 U.S.C. 154(b) by 65 days.

(21) Appl. No.: 10/679,138

(22) Filed: Oct. 3, 2003

(65) Prior Publication Data

US 2005/0074149 A1    Apr. 7, 2005

(51) Int. Cl.
*G06K 9/00* (2006.01)
(52) U.S. Cl. ........................ 382/240; 382/236
(58) Field of Classification Search ............... 438/396; 382/236, 240
See application file for complete search history.

(56) References Cited

U.S. PATENT DOCUMENTS 6,009,342 A * 12/1999 Brasch et al. ............... 600/420

2005/0038619 A1* 2/2005 Degani ...................... 702/100

* cited by examiner

*Primary Examiner*—Caridad Everhart
(74) *Attorney, Agent, or Firm*—Michael J. Donohue; Davis Wright Tremaine LLP

(57) ABSTRACT

A method for analyzing or processing contrast enhanced medical imaging information includes determining whether one or more candidate voxel sets within a Volume of Interest (VOI) exhibit washout curve behavior. If so, the method may identify a candidate voxel set exhibiting washout behavior as a likely malignancy. Otherwise, a method may determine whether one or more candidate voxel sets within the VOI exhibit plateau curve behavior, in which case the method may identify a candidate voxel set exhibiting plateau behavior as a likely malignancy. Otherwise, the method may identify a candidate voxel set exhibiting persistent enhancement behavior as a likely malignancy. In one embodiment, a candidate voxel set exhibiting a given type of time dependent imaging signal intensity curve or profile may be identified as a likely malignancy based upon a highest percent enhancement value.

38 Claims, 4 Drawing Sheets

SYSTEM AND METHOD FOR HIERARCHICAL ANALYSIS OF CONTRAST ENHANCED MEDICAL IMAGING INFORMATION

TECHNICAL FIELD

The present disclosure relates generally to medical imaging techniques. More particularly, the present disclosure describes systems and methods for hierarchically analyzing and/or evaluating dynamic imaging properties corresponding to contrast enhanced medical imaging information to aid differential lesion diagnosis procedures.

BACKGROUND

Medical imaging technologies can provide detailed information useful for differentiating, diagnosing, or monitoring the condition, structure, and/or extent of various types of tissue within a patient's body. In general, medical imaging technologies detect and record manners in which tissues respond in the presence of applied signals and/or injected or ingested substances, and generate visual representations indicative of such responses.

A variety of medical imaging technologies exist, including Computed Tomography (CT), Positron Emission Tomography (PET), Single Photon Emission Computed Tomography (SPECT), and Magnetic Resonance Imaging (MRI). Particular imaging techniques, for example, certain MRI techniques, may scan a volume of tissue within a region of anatomical interest. Scan information or data corresponding to an anatomical volume under consideration may be transformed into or reconstructed as a series of planar images or image "slices." For example, data generated during a breast MRI scan may be reconstructed as a set of 40 or more individual image slices. Any given image slice comprises an array of volume elements or voxels, where each voxel corresponds to an imaging signal intensity within an incremental volume that may be defined in accordance with x, y, and z axes. The z axis commonly corresponds to a distance increment between image slices, that is, image slice thickness.

Any given medical imaging technology may be particularly well suited for differentiating between specific types of tissues. A contrast agent administered to the patient may selectively enhance or affect the imaging properties of particular tissue types to facilitate improved tissue differentiation. For example, MRI may excel at distinguishing between various types of soft tissue, such as malignant and/or benign breast tumors or lesions that are contrast enhanced relative to healthy breast tissue in the presence of Gadolinium DPTA or another contrast agent.

Medical imaging techniques may generate or obtain imaging data corresponding to a given anatomical region at different times or sequentially through time to facilitate detection of changes within the anatomical region from one scan to another. Temporally varying or dynamic tissue dependent contrast agent uptake properties may facilitate accurate identification of particular tissue types. For example, in breast tissue, healthy or normal tissue generally exhibits different contrast agent uptake behavior over time than tumorous tissue. Moreover, malignant lesions generally exhibit different contrast agent uptake behavior than benign lesions ("Measurement and visualization of physiological parameters in contrast-enhanced breast magnetic resonance imaging," Paul A. Armitage et al., *Medical Imaging Understanding and Analysis*, July 2001, University of Birmingham).

In general, at any particular time, the intensity of an imaging signal associated with any particular voxel depends upon the types of tissues within an anatomical region corresponding to the voxel; the presence or absence of a contrast agent in such tissues; and the temporal manners in which such tissues respond following contrast agent administration. In several types of breast MRI situations, normal or healthy tissue exhibits a background signal intensity in the absence of a contrast agent, while abnormal or tumorous tissue exhibits a low or reduced signal intensity relative to the background intensity. Thus, prior to contrast agent administration, abnormal tissue typically appears darker than normal tissue. In the presence of a contrast agent, lesions or certain types of abnormal tissue typically exhibit a time-dependent enhancement of imaging signal intensity relative to the background intensity.

In general, a lesion will exhibit one of three types of time dependent contrast agent uptake behavior. Within imaging data corresponding to a time series of scans, each type of contrast agent uptake behavior manifests as a corresponding type of dynamic imaging signal intensity profile or curve. Each type of dynamic intensity curve probabilistically corresponds to whether the lesion is benign or malignant.

FIG. 1 is a graph 100 that generally illustrates a first, a second, and a third type of dynamic imaging signal intensity or relative enhancement curve 110, 120, 130 that may be obtained for a given region of interest (ROI) (i.e., a set of voxels corresponding to an anatomical region) that encompasses one or more portions of a lesion. In the graph 100, the horizontal axis corresponds to time, while the vertical axis corresponds to imaging signal intensity or the extent to which imaging signal intensity is enhanced relative to an initial or precontrast imaging signal intensity.

Prior to contrast agent administration, a precontrast scan is initiated or performed at a first scan time $t_0$. For any given voxel, the precontrast scan establishes a precontrast imaging signal intensity and/or a reference relative enhancement value that may be represented as a variable $S_0$. Contrast agent administration occurs some time after $t_0$ at a time $t_c$, for example, one minute after $t_0$. Essentially immediately after contrast agent administration, the level of contrast agent within vasculature associated with a lesion increases. Imaging signal intensity or relative imaging signal enhancement associated with the lesion correspondingly increases, typically at a rapid rate during an initial time interval. Depending upon lesion characteristics, tissue dependent contrast agent kinetics may subsequently give rise to in an imaging signal intensity curve that (1) continues to increase or enhance; (2) reaches a peak level of enhancement and then levels off or plateaus in an abrupt or generally abrupt manner; or (3) reaches a peak level of enhancement and subsequently declines to lower or reduced levels of enhancement. Each of the aforementioned curve types is respectively referred to as (1) a continued, steady, or persistent enhancement curve 110; (2) a plateau curve 120; and (3) a washout curve 130.

A first postcontrast scan is performed at a first postcontrast scan time $t_1$, which generally corresponds to a time at or near which a peak in imaging signal intensity and/or relative enhancement $S_1$ would be expected in the context of a plateau or washout curve 120, 130. The first postcontrast scan time $t_1$ may be, for example, one minute after contrast agent administration. For ease of understanding, $S_1$ is shown in FIG. 1 as having an identical value for each curve type 110, 120, 130. More generally, each type of curve 110, 120, 130 may correspond to a unique or distinct $S_1$ value.

A second postcontrast scan is performed at a second postcontrast scan time $t_2$, thereby capturing or acquiring for each voxel another corresponding imaging signal intensity and/or relative enhancement value $S_2$. The interval between $t_1$ and $t_2$ is sufficiently large to improve or maximize a likelihood that imaging signal intensity differences corresponding to times $t_1$ and $t_2$ can facilitate categorization of an imaging signal intensity curve as a persistent enhancement, plateau, or washout curve 110, 120, 130. The time between $t_1$ and $t_2$ may be, for example, approximately 4 minutes.

Dynamic imaging signal intensity or relative enhancement curves are typically numerically characterized in accordance with two parameters, namely, a percent enhancement (PE) value and a signal enhancement ratio (SER). For a given voxel, the PE value is defined as the difference between the first postcontrast imaging signal intensity $S_1$ and the precontrast signal intensity $S_0$, normalized relative to the precontrast signal intensity $S_0$. The SER for any particular voxel may be defined as the difference between the first postcontrast imaging signal intensity $S_1$ and the precontrast signal intensity $S_0$, normalized relative to the difference between the second postcontrast imaging signal intensity $S_2$ and the precontrast signal intensity $S_0$. For persistent enhancement, plateau, and washout curves 110, 120, 130, the SER will have a value that is less than 1.0, equal to 1.0, and greater than 1.0, respectively.

PE values exhibit a correspondence to lesion type. In general, a higher PE value may suggest a higher probability that a lesion is malignant. Some existing systems and/or methods for analyzing dynamic MRI data identify a set of voxels corresponding to a highest PE value or a highest intensity as a malignant lesion. Other existing systems and/or methods may identify (1) a set of voxels corresponding to a PE value above a first reference value as a malignant lesion; (2) a set of voxels corresponding to a PE value below the first reference value and above a second reference value as an indeterminate type of lesion; and (3) a set of voxels corresponding to a PE value below the second reference value as a benign lesion ("Dynamic Breast MR Imaging: Are Signal Intensity Time Course Data Useful for Differential Diagnosis of Enhancing Lesions?", Christiane Kuhl et al., *Radiology*, April 1999).

Curve type 110, 120, 130 also exhibits a correspondence to lesion type. In particular, a washout curve 130 is strongly indicative of a malignant lesion or weakly indicative of a nonmalignant or benign lesion. A plateau curve 120 may be somewhat more indicative of a malignant lesion than a benign lesion. Finally, a persistent enhancement 110 curve is strongly indicative of a benign lesion or weakly indicative of a malignant lesion. Certain methods for analyzing dynamic MRI data identify a curve shape of washout 130 or plateau 120 as malignant, and a persistent enhancement 110 curve as benign (ibid).

Unfortunately, systems and/or methods that analyze contrast enhanced medical imaging data in manners described above fail to adequately increase or maximize diagnostic sensitivity, specificity, and/or accuracy.

DETAILED DESCRIPTION

Figure 1:
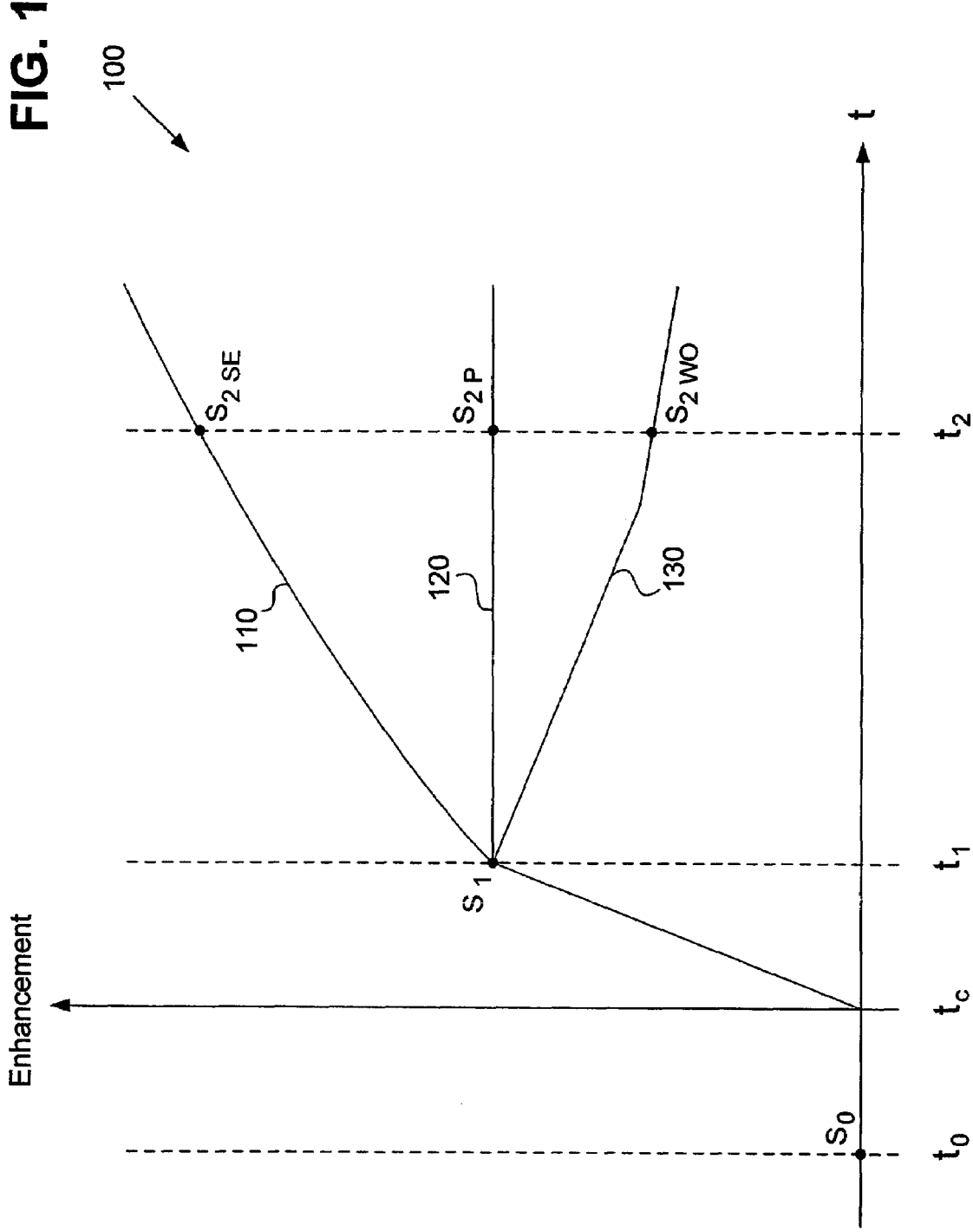
FIG. 1 is a graph that generally illustrates a persistent enhancement, a plateau, and a washout type of dynamic imaging signal intensity profile or curve that may be obtained for a given region of interest that encompasses one or more portions of a lesion.

The present disclosure describes systems and/or methods for hierarchical analysis, evaluation, characterization, and/or processing of contrast enhanced medical imaging information and/or data. Such systems and/or methods may facilitate Computer Aided Detection and/or Computer Aided Diagnosis (CAD) of particular types of medical conditions, tissues, and/or tissue abnormalities such as malignancies. Portions of the following description detail manners in which certain embodiments of the present invention may be applied in an MRI context, particularly MRI imaging of breast tissue. Notwithstanding, various embodiments of systems and/or methods in accordance with the present invention may be applicable to essentially any type of dynamic medical imaging technology and/or technique that utilizes a contrast agent.

One or more portions of various systems and/or methods described herein may be applicable to two and/or three spatial dimensions. For ease of understanding, in the context of the description that follows, a volume of Interest (VOI) may be defined or construed to include, encompass, and/or equivocate to a region of interest (ROI). Similarly, a voxel may be defined or construed to include, encompass, and/or equivocate to a pixel.

Systems and/or methods in accordance with particular embodiments of the invention may analyze a VOI in a selective hierarchical sequence that may include a washout analysis procedure, a plateau analysis procedure, and/or a persistent enhancement analysis procedure. A VOI may comprise at least one, and typically multiple, candidate voxel sets. The washout, plateau, and/or persistent enhancement analysis procedures may respectively determine whether imaging information associated with one or more candidate voxel sets under consideration exhibits dynamic properties corresponding to or indicative of washout, plateau, and/or persistent enhancement behavior.

A washout, plateau, and/or persistent enhancement procedure may use particular values and/or value ranges of one or more types of parameters indicative of dynamic imaging signal behavior as curve type indication thresholds. Such procedures may evaluate acquired and/or generated imaging signal data relative to such thresholds to facilitate identification, characterization, recognition, and/or determination of washout, plateau, and/or persistent enhancement behavior.

In order to improve, increase, or maximize diagnostic sensitivity, specificity, and/or accuracy, a washout analysis procedure may be initiated, performed, and/or executed first, selectively followed by a plateau analysis procedure, selectively followed by a persistent enhancement analysis procedure. If any given washout, plateau, and/or persistent enhancement analysis procedure determines that enhancement behavior associated with one or more candidate voxel sets under consideration matches or corresponds to a type of dynamic behavior to which the analysis procedure is directed, the analysis procedure may identify as a malignancy or a likely malignancy a candidate voxel set that exhibits, essentially exhibits, approximately exhibits, or is expected to exhibit a strongest, most significant, best, most likely, or most adequate correspondence to malignant behavior. In certain embodiments, a voxel set corresponding to a highest percent enhancement (PE) may be identified as malignant or a likely malignancy. Alternatively or additionally, a voxel set corresponding to a steepest, strongest, and/or fastest imaging signal intensity decline may be identified as malignant or a likely malignancy. If a washout or plateau analysis procedure has respectively identified a likely malignancy corresponding a given VOI, a subsequent plateau or persistent enhancement analysis procedure directed to this VOI may be avoided or skipped.

Figure 2:
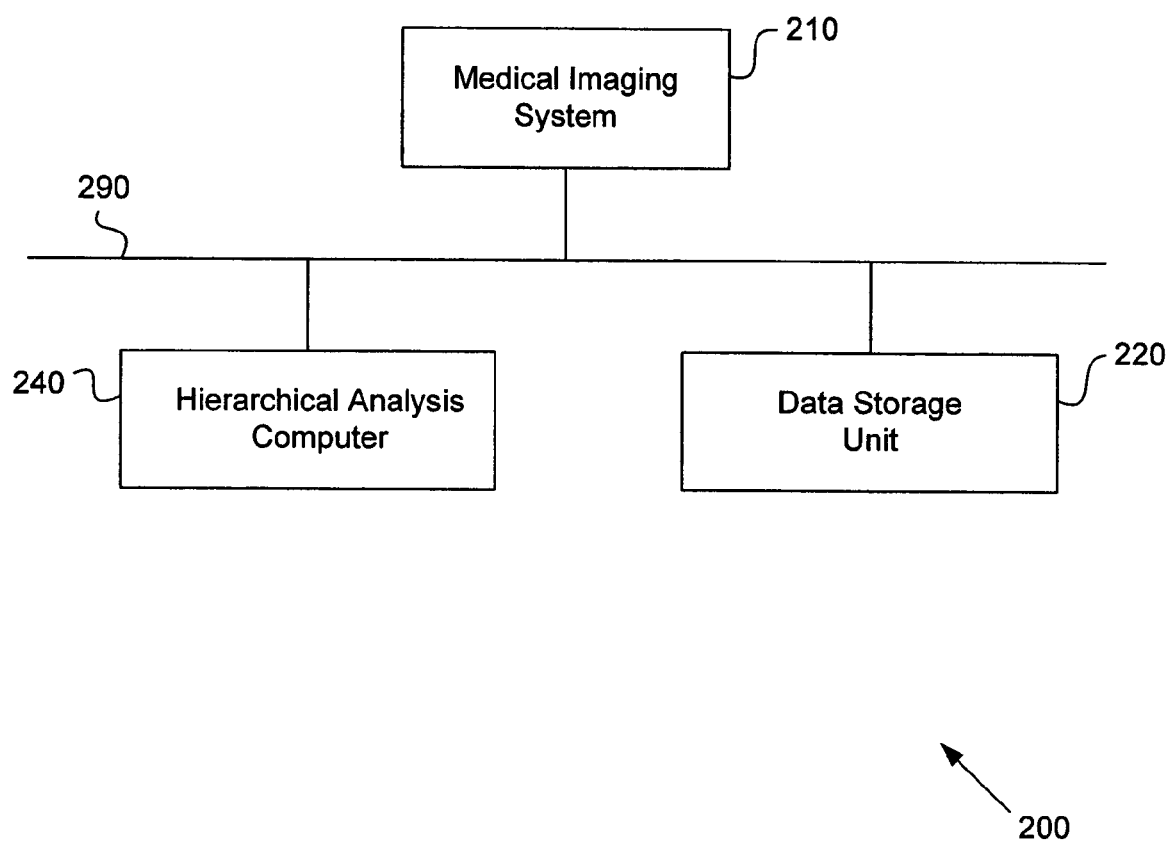
FIG. 2 is a block diagram of a system for hierarchical analysis of contrast enhanced medical imaging information according to an embodiment of the invention.

FIG. 2 is a block diagram of a system 200 for hierarchical analysis of contrast enhanced medical imaging information according to an embodiment of the invention. The system 200 may comprise a medical imaging system 210, a data storage unit 220, and a computer system 240 configured to perform one or more types of hierarchical imaging information analysis procedures according to particular embodiments of the invention. In one embodiment, each element 210, 220, 240 of the system 200 is coupled to a computer network 290. The medical imaging system 210 may comprise an MRI or other type of imaging system. The data storage unit 220 may comprise one or more types of hard disk, optical, and/or magneto-optical drives, and may possibly comprise a Network Attached Storage (NAS) device. The data storage unit 220 may receive, store, and/or transfer imaging data as well as other information.

The computer system 240 may comprise one or more portions of a medical image analysis platform. The computer system 240 may include a processing unit and a memory, and may further include one or more of a disk drive and/or other data storage devices (e.g., optical and/or magneto-optical data storage devices, tape drives, flash memory based drives, etc . . . ), an input device, and an output device. For the sake of clarity, these conventional and well known computer components are not illustrated in FIG. 2. The memory, the disk drive, and/or other data storage devices may comprise one or more portions of computer readable media that store program instructions and possibly data for performing one or more hierarchical imaging information analysis procedures and/or operations associated therewith in accordance with particular embodiments of the invention. Depending upon embodiment details, the network 290 may comprise one or more local or private networks such as a Local Area Network (LAN) and/or one or more public networks such as the Internet.

Figure 3:
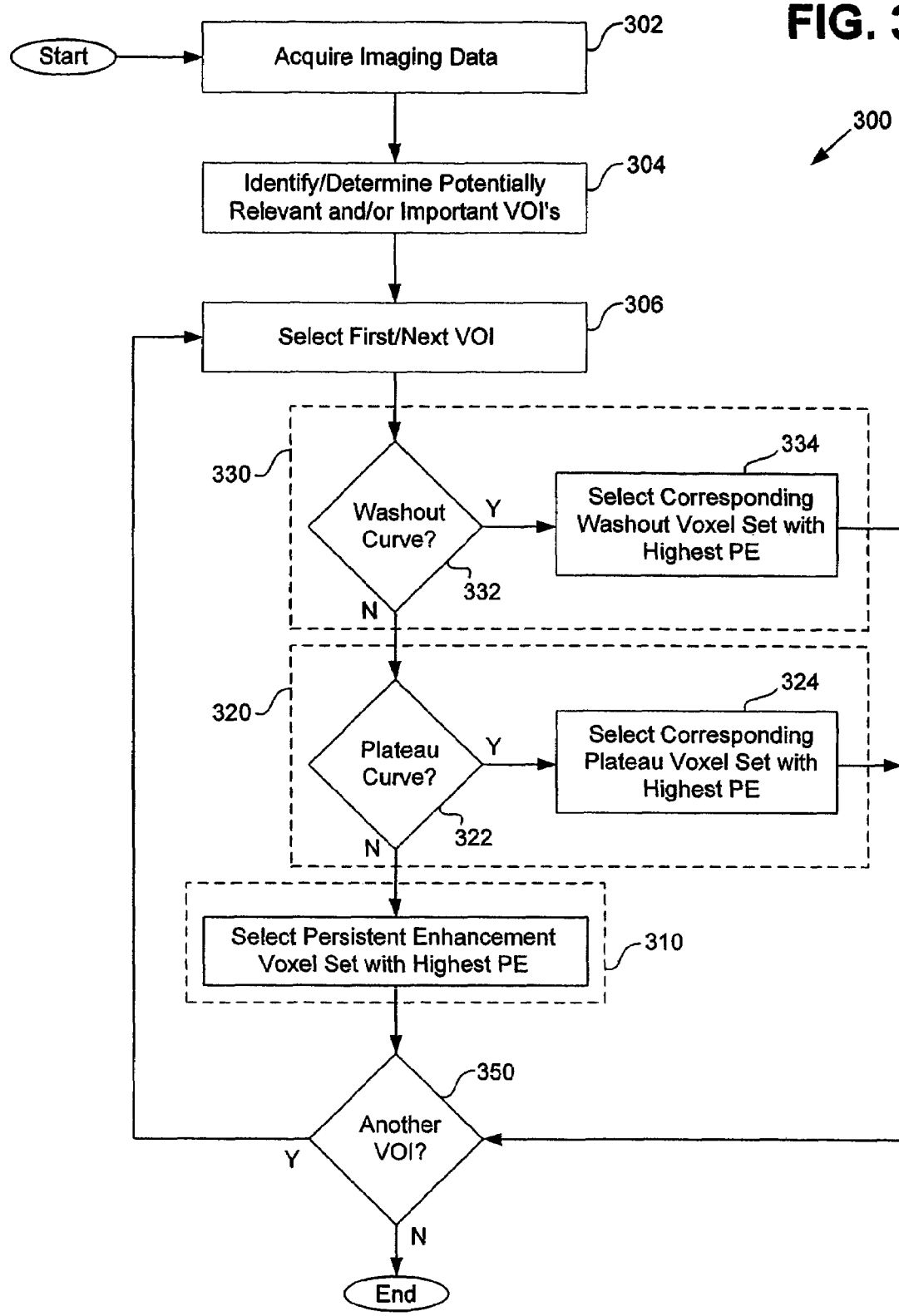
FIG. 3 is a flowchart of a procedure for hierarchical analysis of contrast enhanced medical imaging information according to an embodiment of the invention.

FIG. 3 is a flowchart of a procedure 300 for hierarchical analysis of contrast enhanced medical imaging information according to an embodiment of the invention. In one embodiment, a hierarchical analysis procedure 300 includes an acquisition procedure 302 that involves acquiring, generating, retrieving, receiving, and/or obtaining imaging information, signals, and/or data corresponding to a set or series of medical images. Depending upon embodiment details, imaging information may correspond to breast images (e.g., breast MRI scans) or other types of images. The acquisition procedure 302 may involve or be directed toward at least one precontrast and at least two postcontrast image volumes to facilitate numerical characterization of dynamic or time dependent imaging signal behavior. As further described below, such numerical characterization may involve determination and/or analysis of signal enhancement ratios (SERs) based upon time dependent voxel intensities $S_0$, $S_1$, and $S_2$. In certain embodiments, an acquisition procedure 302 may consider more than two postcontrast image slices to facilitate analysis of time dependent voxel intensities across additional levels of temporal granularity.

The hierarchical analysis procedure 300 may further include a VOI identification procedure 304 that involves identifying or determining one or more VOIs for consideration within the imaging data, where each VOI comprises at least one candidate voxel set. In certain embodiments, elements within a candidate voxel set correspond to voxels that have a potentially increased, increased, and/or significant likelihood of corresponding to abnormal or malignant tissue. Depending upon embodiment details, a candidate voxel set may include one or more individual voxels and/or one or more combined voxels, where a combined voxel may comprise a plurality of voxels that are averaged, mixed, and/or blended. A combined voxel may be based upon or generated through one or more operations upon imaging signal information within or corresponding to a 3×3×1 voxel group; a 9×9×1 voxel group; a 3×3×3 voxel group; and/or an otherwise dimensioned voxel group. One or more candidate voxel sets may be identified or generated in a manner described below with reference to FIG. 4. Alternatively, a candidate voxel set may include or be generated using all, essentially all, or nearly all voxels within (1) an entire imaging dataset; (2) a single or multiple image slices; and/or (3) one or more subsets or segmented portions of the imaging dataset.

The hierarchical imaging information analysis procedure 300 may additionally include a VOI selection procedure 306 that involves selecting a first or a next VOI for consideration. Additionally, depending upon embodiment details, the hierarchical analysis procedure 300 may include a washout analysis procedure 330, and possibly a plateau analysis procedure 320 and/or a persistent enhancement analysis procedure 310.

A washout analysis procedure 330 may include a washout curve search or analysis procedure 332 that involves determining whether one or more candidate voxel sets within a VOI under consideration exhibit dynamic behavior that corresponds to a washout curve 130. In general, the washout curve search procedure 332 may determine whether one or more parameters corresponding to a candidate voxel set indicate an adequately, significantly, and/or strongly decreasing imaging signal intensity or relative enhancement profile over time. In certain embodiments, the washout curve search procedure 332 may involve (1) calculating or retrieving SER values for one or more candidate voxel sets within the VOI under consideration; and/or (2) determining which candidate voxel sets under consideration have SER values corresponding to or indicative of a washout curve 130. In one embodiment, a candidate voxel set may exhibit washout behavior or correspond to a washout curve 130 in the event that an SER value corresponding to the candidate voxel set is greater than a washout SER threshold, for example 1.1. A washout threshold may be specified, established, and/or determined in accordance with clinical conditions and/or statistical considerations.

A candidate voxel set may additionally or alternatively be defined to exhibit washout behavior in the event that a slope and/or an angle corresponding to an imaging signal intensity curve or profile is negative or less than a washout slope and/or a washout angle threshold. For example, an exemplary washout slope threshold may correspond to a percentage decrease in imaging signal intensity of 10% over a 5 minute interval, that is, a slope of −2 percentage units/min. Similarly, an exemplary washout angle threshold may be −5 degrees.

In the event that one or more candidate voxel sets currently under consideration correspond to a washout curve 130, the washout analysis procedure 330 may initiate or execute an identification procedure 334 that involves identifying, selecting, and/or indicating as a malignancy or a likely malignancy which of such candidate voxel sets exhibits a strongest, most significant, best, or most adequate correspondence to malignant behavior. Such correspondence to malignant behavior may be based upon a highest PE value, a strongest or most significant decrease in imaging signal intensity relative to a time period, and/or a most rapid decrease in imaging signal intensity relative to a time period. In one embodiment, an identification procedure 334 identifies as a likely malignancy a candidate voxel set corresponding to a highest PE value. Depending upon embodiment details, the identification procedure 334 may numerically, textually, chromatically, and/or graphically or visually identify a likely malignancy, for example, upon a display device. In particular embodiments, the identification procedure 334 may additionally or alternatively generate a graphical or visual representation of a washout curve 130 that corresponds to the voxel set identified as a likely malignancy. That is, the identification procedure 334 may generate, draw, or and/display a percent enhancement and/or signal intensity versus time curve based upon the imaging data that corresponds to the voxel set identified as a likely malignancy. Such a curve may be displayed separately or in an adjacent or overlapping manner relative to one or more portions of a corresponding displayed VOI.

In one embodiment, an identification procedure 334 may identify more than one voxel set as a likely malignancy, possibly in accordance with an ordering or prioritization scheme. An ordering scheme may identify or indicate a voxel set having a highest likelihood of corresponding to a malignancy, a voxel set having a next highest likelihood of corresponding to a malignancy, and possibly one or more additional voxel sets in an analogous manner. In such an embodiment, an identification procedure 334 may visually specify or indicate each such voxel set in a unique manner, for example, using distinct colors.

In the event that washout behavior is absent or apparently absent within the VOI currently under consideration, the hierarchical analysis procedure 300 may initiate or execute a plateau analysis procedure 320. In one embodiment, the plateau analysis procedure 320 includes a plateau curve search or analysis procedure 322 that involves determining whether one or more candidate voxel sets within the VOI under consideration exhibit time dependent behavior corresponding to a plateau curve 120. In general, the plateau curve search procedure 322 may determine whether one or more parameters corresponding to a candidate voxel set indicate a constant, unchanging, or generally unchanging imaging signal intensity curve or profile over time.

In certain embodiments, the plateau curve search procedure 322 may involve determining which candidate voxel sets under consideration have SER values corresponding to or indicative of a plateau curve 120. In one embodiment, a candidate voxel set may exhibit plateau behavior or correspond to a plateau curve 120 in the event that a corresponding SER value is less than a washout threshold, for example, 1.1, and greater than a persistent enhancement threshold, for example, 0.9 (i.e., the SER falls or generally falls within a range that indicates a flat or generally flat imaging signal intensity or relative enhancement profile over time). In a manner analogous to that for a washout threshold, a persistent enhancement threshold may be specified, established, or determined in accordance with clinical conditions and/or statistical considerations.

A candidate voxel set may alternatively or additionally be defined to exhibit plateau behavior in the event that a slope and/or an angle corresponding to a time dependent imaging signal intensity curve or profile is less than a persistent enhancement slope and/or angle threshold (for example, +2 percentage units/minute and +5 degrees, respectively), and greater than a washout slope and/or angle threshold (for example, −2 percentage units/minute and −5 degrees, respectively).

In the event that one or more candidate voxel sets currently under consideration correspond to a plateau curve 120, the plateau analysis procedure 320 may initiate or execute an identification procedure 324 that involves identifying, selecting, and/or indicating as a malignancy or a likely malignancy which of such candidate voxel sets exhibits a strongest, most significant, best, or most adequate correspondence to malignant behavior. Such correspondence to malignant behavior may be based upon a highest PE value, and/or a most stable, unchanging, constant, or flattest imaging signal intensity relative to a time period. In one embodiment, an identification procedure 334 identifies as a likely malignancy a candidate voxel set corresponding to a highest PE value. Depending upon embodiment details, the identification procedure 324 may indicate a likely malignancy in one or more manners described above. In one embodiment, an identification procedure 324 may identify more than one voxel set as a likely malignancy, possibly in accordance with an ordering or prioritization scheme, in a manner analogous to that described above.

In the event that washout and plateau behavior is absent or apparently absent within the VOI currently under consideration, the hierarchical analysis procedure 300 may initiate or execute a persistent enhancement search or analysis procedure 310. In one embodiment, the persistent enhancement search procedure 310 involves identifying, selecting, and/or indicating a candidate voxel set within or corresponding to the VOI currently under consideration that exhibits a strongest, most significant, best, or most adequate correspondence to malignant behavior. Such correspondence may be based upon a highest PE value, a most significant increase in imaging signal intensity relative to a time period, and/or a most rapid increase in imaging signal intensity relative to a time period. In certain embodiments, a persistent enhancement search procedure 310 identifies a candidate voxel set corresponding to a highest PE value as a malignancy or likely malignancy. The persistent enhancement search procedure 310 may indicate a likely malignancy in one or more manners previously described. In one embodiment, a persistent enhancement search procedure 310 may identify more than one voxel set as a likely malignancy, possibly in accordance with an ordering or prioritization scheme, in a manner analogous to that described above.

The hierarchical analysis procedure 300 may further include a continuation procedure 350 that involves determination of whether another VOI requires consideration. If so, the hierarchical analysis procedure 300 may return to the VOI selection procedure 306; otherwise, further hierarchical analysis may not be required.

Figure 4:
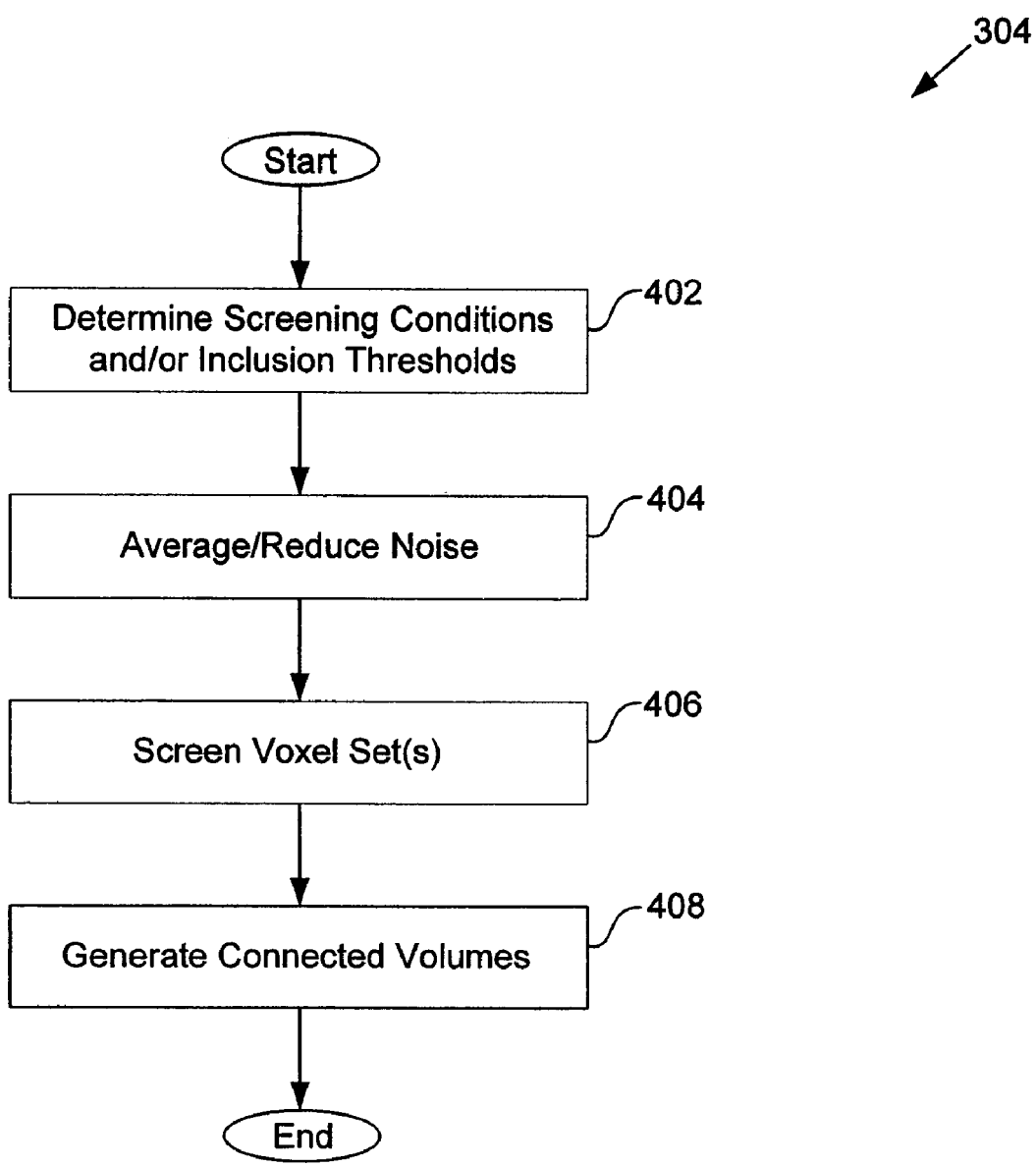
FIG. 4 is a flowchart of a procedure for identifying or generating one or more volumes of interest (VOIs) according to an embodiment of the invention.

FIG. 4 is a flowchart of a VOI identification procedure 304 according to an embodiment of the invention. Depending upon embodiment details, the VOI identification procedure 304 may include a screening condition determination procedure 402, a noise reduction procedure 404, a voxel set screening procedure 406, and/or a volume connection procedure 408.

A screening condition determination procedure 402 may involve determining, establishing, defining, identifying, generating, and/or retrieving one or more inclusion and/or exclusion thresholds that establish conditions that individual and/or combined voxels may or must satisfy to increase a likelihood of being diagnostically relevant. In one embodiment, a screening condition determination procedure 402 involves determining or defining a minimum enhancement threshold that individual and/or combined voxels must satisfy, for example, a minimum PE of 50%.

Enhancement rate thresholds, such as achievement of a predetermined PE within a specified time period, may be used as a screening condition. A screening condition determination procedure 402 may additionally or alternatively involve calculating a difference threshold that may facilitate identification of individual and/or combined voxels having a valid or an invalid dynamic intensity profile. An exemplary invalid intensity profile may correspond to an individual and/or combined voxel for which $S_0=2$, $S_1=4$, and $S_2=2$. Although such a voxel exhibits 100% enhancement, it should be excluded from consideration due to its minimal or negligible maximum intensity (i.e., this is a very dim voxel). In one embodiment, a difference threshold may be determined by (1) calculating $(S_1-S_0)$ for each voxel to generate a subtraction data set; (2) computing a standard deviation for positive values within this subtraction data set; and (3) defining the difference threshold as a multiple (e.g., 3) of the subtraction data set's standard deviation.

A noise reduction procedure 404 may involve generating combined voxels by averaging, blending, and/or combining imaging signal intensity information corresponding to a plurality of individual voxels to reduce or minimize the effect of signal noise. In one embodiment, the noise reduction procedure 404 involves averaging (or some other noise reduction technique such as Gaussian filtering) precontrast, first postcontrast, and second postcontrast imaging slice information using a 3×3×1 or otherwise dimensioned kernel (e.g., 3×3×3).

A voxel set screening procedure 406 may involve determining which individual voxels and/or combined voxels to retain and/or discard prior to a VOI selection procedure 306. In one embodiment, a voxel set screening procedure 406 involves examining, comparing, and/or screening imaging signal intensity values corresponding to individual and/or combined voxels in accordance with inclusion and/or exclusion thresholds defined and/or determined in association with a screening condition determination procedure 402. A screening procedure 406 may involve retaining those individual and/or combined voxels for which (1) an imaging signal intensity value exceeds a difference threshold; and/or (2) a PE value is greater than a minimum enhancement threshold.

In one embodiment, a volume connection procedure 408 involves performing a connected component analysis upon individual and/or combined voxels that are retained as a result of a voxel set screening procedure 406, thereby generating one or more VOIs. A volume connection procedure 408 may additionally sort such VOIs in accordance with VOI size and/or other parameters.

From the foregoing, it will be appreciated that specific embodiments of the invention have been described herein for purposes of illustration, but that various modifications may be made without deviating from the spirit and scope of the invention. For example, certain embodiments of the invention may determine whether a candidate voxel set exhibits persistent enhancement behavior in the event that washout behavior is absent, possibly by determining whether a signal enhancement ratio exceeds a persistent enhancement threshold and/or analyzing or evaluating imaging signal behavior relative to a persistent enhancement slope and/or angle. Accordingly, the invention is not limited except as by the appended claims.

I claim:

1. A method of processing contrast enhanced medical imaging information, the medical imaging information corresponding to a time dependent imaging signal behavior associated with at least one tissue volume, the method comprising:
   detecting an initial increase in the imaging signal intensity following the administration of an imaging contrast agent;
   subsequent to the initial increase in the imaging signal intensity, automatically determining whether a portion of a tissue volume exhibits an imaging signal washout behavior;
   if a portion of the tissue volume exhibits the imaging signal washout behavior, analyzing the portion of the tissue volume to determine a section of the portion of the tissue volume exhibiting the greatest degree of washout behavior and identifying the portion of the tissue volume exhibiting the greatest degree of washout behavior as a likely malignancy;
   only in the event that the portion of a tissue volume fails to exhibit the imaging signal washout behavior, automatically determining whether the portion of a tissue volume exhibits an imaging signal plateau behavior;
   if a portion of the tissue volume exhibits the imaging signal plateau behavior, analyzing the portion of the tissue volume to determine a section of the portion of the tissue volume exhibiting the greatest degree of plateau behavior;
   only in the event that the portion of the tissue volume fails to exhibit the imaging signal washout behavior and fails to exhibit the imaging signal plateau behavior, automatically determining whether the portion of the tissue volume exhibits an imaging signal persistent enhancement behavior;
   if a portion of the tissue volume exhibits the imaging signal persistent enhancement behavior, analyzing the portion of the tissue volume to determine a section of the portion of the tissue volume exhibiting the greatest degree of washout behavior; and
   identifying at least one likely malignancy within the portion of the tissue volume.

2. The method of claim 1, wherein identifying comprises generating a visual indication of a type of time dependent imaging signal behavior corresponding to the portion of a tissue volume.

3. The method of claim 1, wherein the medical imaging information comprises Magnetic Resonance Imaging data.

4. The method of claim 1, wherein the medical imaging information corresponds to a breast.

5. A method of processing contrast enhanced medical imaging information following the administration of an imaging contrast agent, the medical imaging information comprising imaging signal intensity values associated with at least one candidate voxel set corresponding to a tissue volume, the method comprising:
   detecting an initial increase in the imaging signal intensity values;

at a time following the initial increase, determining whether a candidate voxel set exhibits an imaging signal washout behavior;

only in the event that the candidate voxel set fails to exhibit an imaging signal washout behavior, determining whether the candidate voxel set exhibits an imaging signal plateau behavior;

only in the event that the candidate voxel set fails to exhibit an imaging signal washout behavior or an imaging signal plateau behavior, determining whether the candidate voxel set exhibits an imaging signal persistent enhancement behavior; and identifying a candidate voxel set as a likely malignancy on the basis of imaging signal behavior.

6. The method of claim 5, wherein identifying a candidate voxel set as a likely malignancy comprises identifying a highest percent enhancement value corresponding to a candidate voxel set.

7. The method of claim 5, wherein identifying a candidate voxel set as a likely malignancy comprises identifying a most significant imaging signal intensity decline corresponding to a candidate voxel set.

8. The method of claim 5, wherein identifying a candidate voxel set as a likely malignancy comprises identifying a most significant rate of imaging signal intensity decline corresponding to a candidate voxel set.

9. The method of claim 5, wherein identifying a candidate voxel set as a likely malignancy comprises generating at least one from the group of a numerical, a textual, a chromatic, and a graphic indication of the likely malignancy.

10. The method of claim 5, wherein identifying a candidate voxel set as a likely malignancy comprises generating upon a display device an indication of the likely malignancy.

11. The method of claim 5, wherein identifying a candidate voxel set as a likely malignancy comprises visually indicating a type of curve representing a time dependent imaging signal behavior that corresponds to the candidate voxel set.

12. The method of claim 5, wherein identifying a candidate voxel set as a likely malignancy comprises displaying one from the group of a washout curve, a plateau curve, and a persistent enhancement curve.

13. The method of claim 5, wherein identifying a candidate voxel set as a likely malignancy comprises identifying a flattest imaging signal intensity relative to a time period.

14. The method of claim 5, wherein identifying a candidate voxel set as a likely malignancy comprises identifying a most strongly enhancing imaging signal intensity relative to a time period.

15. The method of claim 5, wherein determining whether a candidate voxel set exhibits an imaging signal persistent enhancement behavior is performed in the event that a candidate voxel set fails to exhibit an imaging signal washout behavior and a candidate voxel set fails to exhibit an imaging signal plateau behavior.

16. The method of claim 5, wherein the medical imaging information comprises Magnetic Resonance Imaging data.

17. The method of claim 5, wherein the medical imaging information corresponds to a breast.

18. The method of claim 5, wherein determining whether a candidate voxel set exhibits an imaging signal washout behavior comprises determining whether a signal enhancement ratio corresponding to a candidate voxel set exceeds a washout threshold value.

19. The method of claim 18, wherein the washout threshold value is approximately equal to 1.1.

20. The method of claim 5, wherein determining whether a candidate voxel set exhibits an imaging signal washout behavior comprises determining whether a slope corresponding to a candidate voxel set is less than a washout slope value.

21. The method of claim 20, wherein the washout slope value is approximately equal to −2.0 percentage units per minute.

22. The method of claim 5, wherein determining whether a candidate voxel set exhibits an imaging signal washout behavior comprises determining whether an angle corresponding to a candidate voxel set is less than a washout angle value.

23. The method of claim 22, wherein the washout angle value is approximately equal to −5 degrees.

24. The method of claim 5, wherein determining whether a candidate voxel set exhibits an imaging signal plateau behavior comprises determining whether a signal enhancement ratio corresponding to a candidate voxel set is less than a first threshold value and greater than a second threshold value.

25. The method of claim 24, wherein the first threshold value is approximately equal to 1.1, and the second threshold value is approximately equal to 0.9.

26. The method of claim 5, wherein determining whether a candidate voxel set exhibits an imaging signal plateau behavior comprises determining whether a slope corresponding to a candidate voxel set is less than a first slope value and greater than a second slope value.

27. The method of claim 26, wherein the first slope value is approximately equal to 2 percentage units per minute and the second slope value is approximately equal to −2 percentage units per minute.

28. The method of claim 5, wherein determining whether a candidate voxel set exhibits an imaging signal plateau behavior comprises determining whether a slope corresponding to a candidate voxel set is less than a first angle value and greater than a second angle value.

29. The method of claim 28, wherein the first angle value is approximately equal to 5 degrees and the second angle value is approximately equal to −5 degrees.

30. A method of processing contrast enhanced medical imaging information following the administration of an imaging contrast agent, the medical imaging information comprising imaging signal intensity values associated with at least one candidate voxel set corresponding to a tissue volume, the method comprising:

detecting an initial increase in the imaging signal intensity value in a candidate voxel set;

after the initial increase, performing a sequential analysis to determine whether the candidate voxel set exhibits an imaging signal washout behavior, an imaging signal plateau behavior, or an imaging signal persistent enhancement behavior wherein the analysis to determine imaging signal plateau behavior is performed only if the candidate voxel set does not exhibit any imaging signal washout behavior, and the analysis to determine imaging signal persistent enhancement behavior is performed only if the candidate voxel set does not exhibit any imaging signal washout behavior or any imaging signal plateau behavior; and identifying the candidate voxel set as a likely malignancy on the basis of the analysis.

31. A method of processing contrast enhanced medical imaging information, the medical imaging information comprising imaging signal intensity values associated with at least one candidate voxel set corresponding to a tissue volume, the method comprising:

detecting an initial increase in the imaging intensity values in the candidate voxel set;

after detecting the initial increase, determining whether the candidate voxel set exhibits an imaging signal washout behavior;

identifying the candidate voxel set as a likely malignancy corresponding to a washout behavior in the event that the candidate voxel set exhibits the imaging signal washout behavior;

determining whether the candidate voxel set exhibits an imaging signal plateau behavior in the event that the candidate voxel set fails to exhibit the imaging signal washout behavior; and identifying the candidate voxel set as a likely malignancy corresponding to a plateau behavior in the event that the candidate voxel set fails to exhibit the imaging signal washout behavior and exhibits the imaging signal plateau behavior.

32. The method of claim 31, further comprising identifying the candidate voxel set as a likely malignancy corresponding to a persistent enhancement behavior in the event that the candidate voxel set fails to exhibit the imaging signal washout behavior and the candidate voxel set fails to exhibit the imaging signal plateau behavior.

33. A computer readable medium containing program instructions to cause a computer to:

after an initial increase in imaging signal intensity, determine whether a candidate voxel set that forms a portion of a medical imaging data set corresponding to a tissue volume exhibits an imaging signal washout behavior;

determine whether the candidate voxel set exhibits an imaging signal plateau behavior only in the event that the candidate voxel set fails to exhibit imaging signal washout behavior;

determine whether the candidate voxel set exhibits an imaging signal persistent enhancement behavior only in the event that the candidate voxel set fails to exhibit either imaging signal washout behavior or imaging signal plateau behavior; and identify a candidate voxel set as a likely malignancy.

34. The computer readable medium of claim 33, wherein the program instructions for determining whether a candidate voxel set exhibits an imaging signal washout behavior comprise program instructions for performing at least one from the group of a signal enhancement ratio analysis, an imaging signal intensity change analysis, and an imaging signal rate of intensity change analysis.

35. The system of claim 33, wherein the program instructions for determining whether a candidate voxel set exhibits an imaging signal plateau behavior comprise program instructions for performing at least one from the group of a signal enhancement ratio analysis, an imaging signal intensity change analysis, and an imaging signal rate of intensity change analysis.

36. The computer readable medium of claim 33, wherein the program instructions for identifying a candidate voxel set as a likely malignancy comprise program instructions for performing at least one from the group of a percent enhancement value analysis, an imaging signal intensity change analysis, and an imaging signal rate of intensity change analysis.

37. The computer readable medium of claim 33, wherein the program instructions for identifying a candidate voxel set as a likely malignancy comprise program instructions for generating at least one from the group of a numerical, a textual, a chromatic, and a graphic indication of the likely malignancy.

38. The computer readable medium of claim 33, wherein the program instructions for identifying a candidate voxel set as a likely malignancy comprise program instructions for displaying a curve corresponding to the candidate voxel set.

\* \* \* \* \*